United States Patent
Dube et al.

(10) Patent No.: US 12,006,837 B2
(45) Date of Patent: Jun. 11, 2024

(54) CERAMIC MATRIX COMPOSITE ARTICLE AND METHOD OF MAKING THE SAME

(71) Applicant: Raytheon Technologies Corporation, Farmington, CT (US)

(72) Inventors: Bryan P. Dube, Columbia, CT (US); David A. Litton, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/587,764

(22) Filed: Jan. 28, 2022

(65) Prior Publication Data
US 2023/0243265 A1 Aug. 3, 2023

(51) Int. Cl.
*F01D 5/18* (2006.01)
*F01D 5/28* (2006.01)

(52) U.S. Cl.
CPC .......... *F01D 5/186* (2013.01); *F01D 5/284* (2013.01); *F01D 5/288* (2013.01); *F05D 2230/90* (2013.01); *F05D 2260/202* (2013.01); *F05D 2260/232* (2013.01); *F05D 2300/6033* (2013.01); *F05D 2300/611* (2013.01)

(58) Field of Classification Search
CPC .......... F01D 5/186; F01D 5/187; F01D 5/288; F05D 2230/90; F05D 2260/202
See application file for complete search history.

(56) References Cited

U.S. PATENT DOCUMENTS

| | | | | |
|---|---|---|---|---|
| 3,542,486 A | * | 11/1970 | Adiutori | F01D 5/187 415/115 |
| 4,738,588 A | * | 4/1988 | Field | F01D 5/186 415/115 |
| 5,687,679 A | * | 11/1997 | Mullin | B82Y 30/00 123/41.72 |
| 6,092,982 A | * | 7/2000 | Ikeda | F01D 5/186 137/809 |
| 6,908,657 B2 | * | 6/2005 | Farmer | B23P 6/002 416/97 R |

(Continued)

FOREIGN PATENT DOCUMENTS

| | | |
|---|---|---|
| EP | 3070406 | 9/2016 |
| EP | 3150802 | 4/2017 |

OTHER PUBLICATIONS

The extended European Search Report for European Patent Application No. 23153507.1 dated Jun. 29, 2023.

*Primary Examiner* — Eldon T Brockman
(74) *Attorney, Agent, or Firm* — Carlson, Gaskey & Olds, P.C.

(57) ABSTRACT

A ceramic matrix composite component includes a ceramic matrix composite wall; a coating disposed on the wall; and a cooling hole formed in the wall. The cooling hole has a metering section defined along a first axis and a diffuser section defined along a second axis that is offset from the first axis. The cooling hole has a total length defined along the first axis, the total length being the sum of a length of the metering portion and a length of the diffuser portion. The length of the metering portion is between about 40 percent and about 85 percent of the total length. A ceramic matrix composite airfoil and a method of applying a coating to a ceramic matrix composite component are also disclosed.

19 Claims, 3 Drawing Sheets

(56) References Cited

U.S. PATENT DOCUMENTS

| | | | | |
|---|---|---|---|---|
| 6,994,514 B2* | 2/2006 | Soechting | ............... | F01D 5/187 |
| | | | | 415/115 |
| 8,672,613 B2* | 3/2014 | Bunker | ............... | F01D 5/186 |
| | | | | 29/889.721 |
| 8,915,713 B2* | 12/2014 | Boyer | ............... | F01D 5/288 |
| | | | | 416/232 |
| 9,915,150 B2* | 3/2018 | Dahlke | ............... | F01D 5/187 |
| 9,957,811 B2* | 5/2018 | Hucker | ............... | F01D 5/186 |
| 9,969,009 B2* | 5/2018 | Luketic | ............... | B23B 35/00 |
| 10,233,775 B2* | 3/2019 | Bunker | ............... | F01D 5/186 |
| 10,443,395 B2* | 10/2019 | Webster | ............... | F01D 5/186 |
| 10,895,157 B2* | 1/2021 | Dudebout | ............... | F01D 5/288 |
| 11,168,570 B1* | 11/2021 | Lewis | ............... | F01D 5/186 |
| 11,352,888 B2* | 6/2022 | Zhang | ............... | F01D 5/282 |
| 2005/0220618 A1* | 10/2005 | Zhang | ............... | F01D 5/186 |
| | | | | 416/97 R |
| 2010/0192588 A1* | 8/2010 | Gerendas | ............... | B23K 26/389 |
| | | | | 60/752 |
| 2012/0051941 A1* | 3/2012 | Bunker | ............... | F01D 5/186 |
| | | | | 416/97 R |
| 2014/0161585 A1* | 6/2014 | Arness | ............... | F01D 5/186 |
| | | | | 415/177 |
| 2016/0123156 A1* | 5/2016 | Hucker | ............... | F23R 3/005 |
| | | | | 60/752 |
| 2016/0201507 A1* | 7/2016 | Bunker | ............... | F01D 9/02 |
| | | | | 415/116 |
| 2017/0268347 A1* | 9/2017 | Dahlke | ............... | F01D 5/186 |
| 2018/0306114 A1 | 10/2018 | Dudebout et al. | | |
| 2019/0085705 A1 | 3/2019 | Webster et al. | | |
| 2020/0024951 A1* | 1/2020 | Herman | ............... | F01D 5/186 |
| 2022/0034230 A1* | 2/2022 | Ikehara | ............... | F02C 7/18 |

\* cited by examiner

CERAMIC MATRIX COMPOSITE ARTICLE AND METHOD OF MAKING THE SAME

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Ceramic matrix composites ("CMC") are being considered for certain gas turbine engine components, and have usefulness in other fields as well. For instance, CMCs can be employed for airfoils in the compressor or turbine sections of a gas turbine engine. Among other attractive properties, CMCs have high temperature resistance. Despite this attribute, however, there are unique challenges to implementing CMCs in airfoils.

SUMMARY

A ceramic matrix composite component according to an exemplary embodiment of this disclosure, among other possible things includes a ceramic matrix composite wall; a coating disposed on the wall; and a cooling hole formed in the wall. The cooling hole has a metering section defined along a first axis and a diffuser section defined along a second axis that is offset from the first axis. The cooling hole has a total length defined along the first axis, the total length being the sum of a length of the metering portion and a length of the diffuser portion. The length of the metering portion is between about 40 percent and about 85 percent of the total length.

In a further example of the foregoing, the length of the diffuser section is greater than a thickness of the coating.

In a further example of any of the foregoing, a ratio of the length of the diffuser section to the thickness of the coating is at least about 3.

In a further example of any of the foregoing, the length of the metering portion along the first axis is between about 60 percent and about 70 percent of the total length.

In a further example of any of the foregoing, a size of the offset is equivalent to a difference between a diameter of the diffuser section and a diameter of the metering section.

In a further example of any of the foregoing, a ratio of the diameter of the diffuser section to the diameter of the metering section is between about 1.25 and about 2.5.

In a further example of any of the foregoing, the metering portion is free from the coating.

In a further example of any of the foregoing, the coating takes up less than about 50% of a volume of the diffuser portion.

A ceramic matrix composite airfoil according to an exemplary embodiment of this disclosure, among other possible things includes a ceramic matrix composite wall defining an inner cavity; a coating disposed on an outer surface of the wall; and a cooling hole formed in the wall. The cooling wall has a metering portion in fluid communication with the inner cavity and defined along a first axis, and a diffuser section defined along a second axis that is offset from the first axis. The cooling hole has a total length defined along the first axis, the total length being the sum of a length of the metering portion and a length of the diffuser section. The length of the metering portion is between about 40 percent and about 85 percent of the total length.

In a further example of the foregoing, the length of the diffuser section is greater than a thickness of the coating.

In a further example of any of the foregoing, a ratio of the length of the diffuser section to the thickness of the coating is at least about three.

In a further example of any of the foregoing, the length of the metering portion along the first axis is between about 60 percent and about 70 percent of the total length.

In a further example of any of the foregoing, the second axis is spaced from the first axis by an offset. A size of the offset is equivalent to a difference between a diameter of the diffuser section and a diameter of the metering section.

In a further example of any of the foregoing, a ratio of the diameter of the diffuser section to the diameter of the metering section is between about 1.25 and about 2.5.

In a further example of any of the foregoing, the metering section is free from the coating.

In a further example of any of the foregoing, the coating takes up less than about 50% of a volume of the diffuser portion.

A method of applying a coating to a ceramic matrix composite component according to an exemplary embodiment of this disclosure, among other possible things includes providing a ceramic matrix composite component having a cooling hole therethrough. The cooling hole has a metering section in fluid communication with the inner cavity and defined along a first axis, and a diffuser section defined along a second axis that is offset from the first axis. The method also includes applying a coating to a surface of the ceramic matrix composite in a direction of the offset.

In a further example of the foregoing, the metering portion is free from the coating after the applying step.

In a further example of any of the foregoing, the coating takes up less than about 50% of a volume of the diffuser portion.

In a further example of any of the foregoing, the cooling hole has a total length defined along the first axis, the total length being the sum of a length of the metering section and a length of the diffuser portion, and the length of the metering section is between about 40 percent and about 85 percent of the total length.

DETAILED DESCRIPTION

Figure 1:
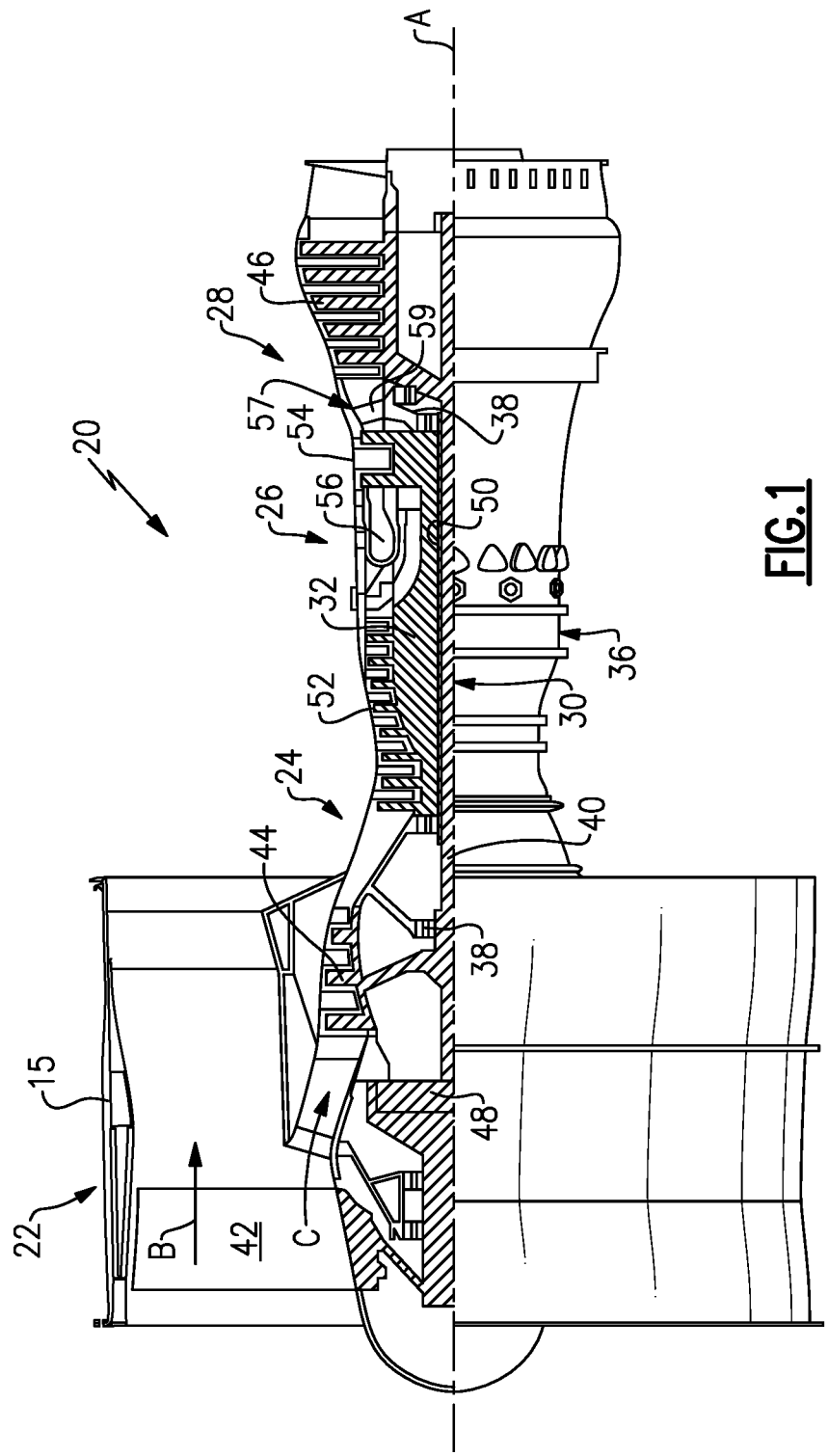
FIG. 1 schematically shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46, The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Alternatively, the low pressure compressor 44 includes a forward hub 45A and an aft hub 45B driven by the inner shaft 40.

Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. In the illustrated example, the mid-turbine frame 57 only includes a bearing system 38 that supports the high spool 50 and the mid-turbine frame 57 does not support the low speed spool 30. Additionally, a pair of bearing systems 38E are located adjacent a downstream end of the low speed spool 30 adjacent an exhaust outlet of the gas turbine engine to support the low speed spool 30. Furthermore, a bearing assembly 38C can be located radially inward from the combustor 56 and supported by a diffuser case and be used in place of or in addition to the bearing system 38 associated with the mid-turbine frame 57. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C, The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49. In one example, the low pressure compressor 44 includes at least 4 stages and no more than 7 stages and in another example, the low pressure compressor 44 includes at least 5 stages and no more than 7 stages. In both examples, the high pressure compressor 52 includes more stages than the low pressure compressor.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. With the planetary gear system, the ring gear is fixed from rotation relative to the engine static structure 36 and the carrier rotates with the fan 42. With the star gear system, the carrier is fixed from rotation relative to the engine static structure 36 and the ring gear rotates with the fan 42. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0 4.2. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0, Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters), The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of [(Tram °R)/(518.7° R)]0.5. The corrected fan tip speed can be less than or equal to 1150.0 ft/second (350.5 meters/second), and can be greater than or equal to 1000.0 ft/second (304.8 meters/second).

Some of the components of the gas turbine engine 20, such as airfoils in the turbine section 28, can be made of ceramic matrix composite (CMC) materials. In general, CMC components include ceramic-based reinforcements, such as fibers, in a ceramic-based matrix. CMC components optionally include coatings that can provide mechanical, thermal, and/or environmental protection to the underlying CMC material.

In the example where the reinforcements are fibers, the fibers can be arranged in a variety of ways that are known in the art, such as unidirectionally, various weaves, braids, etc. and in some particular examples, the fibers can be arranged in bundles or tows. However, it should be understood that other non-fiber reinforcements such as grains or particles are also contemplated.

Figure 2:
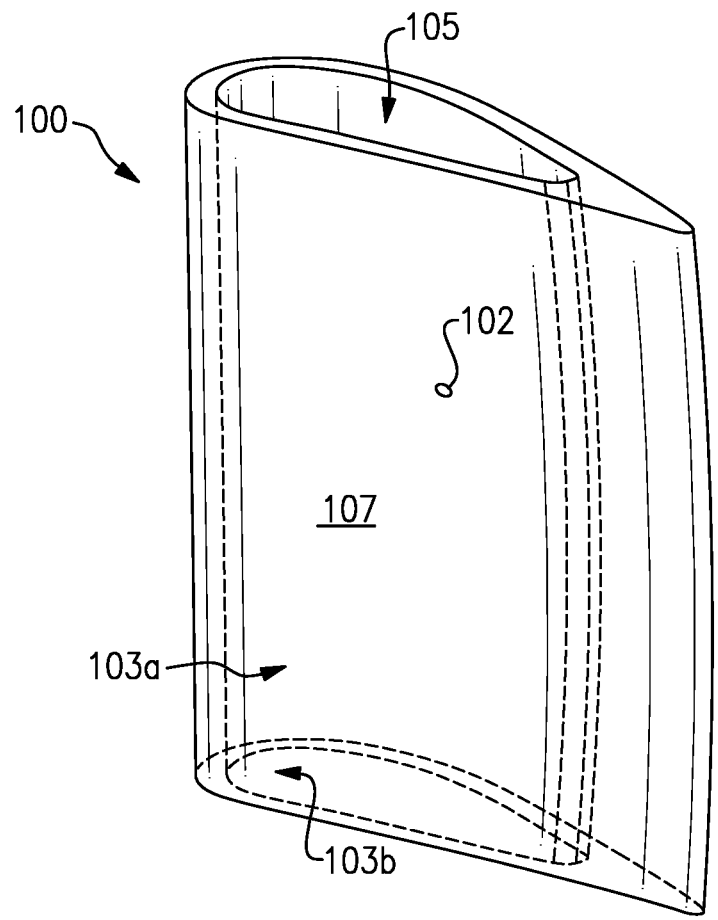
FIG. 2 schematically shows an example ceramic matrix composite airfoil.
Figure 3A:
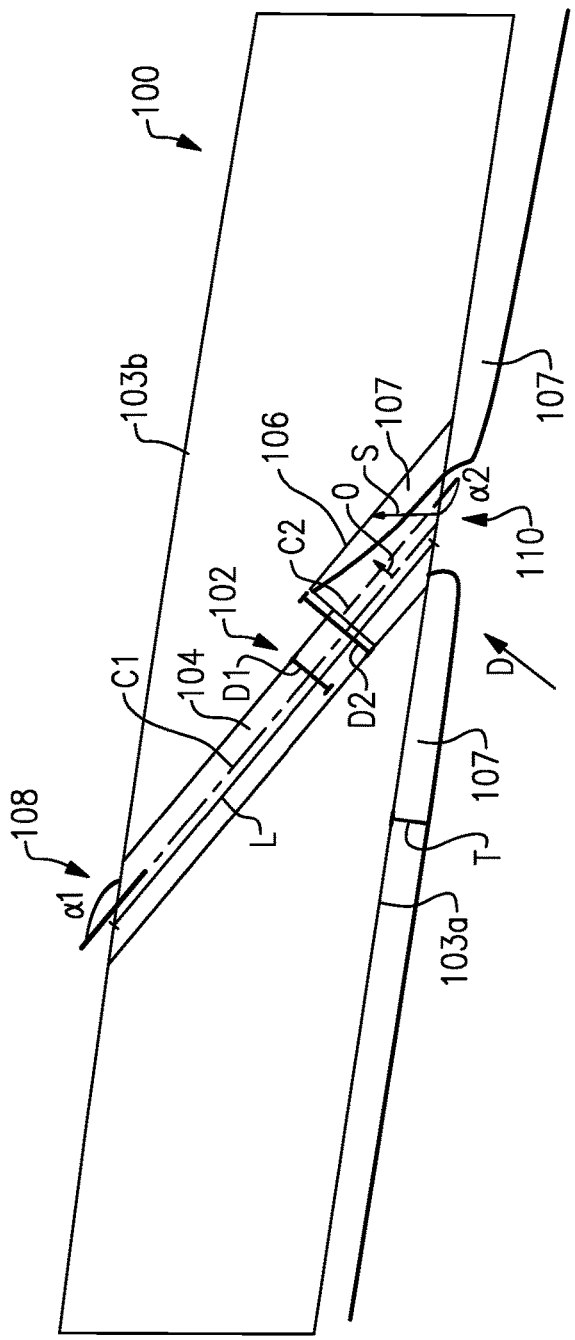
FIGS. 3A-B show detail views of a cooling hole in the ceramic matrix composite airfoil of FIG. 2.
Figure 3B:
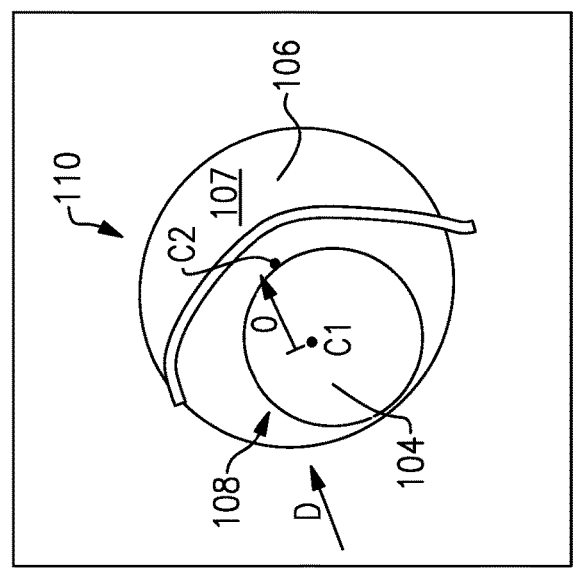

Some CMC components include cooling holes. FIG. 2 shows a detail view of an example CMC component 100 with a cooling hole 102 though the CMC component wall. FIGS. 3A-B show detail views of the cooling hole 102. In this example, the CMC component 100 is an airfoil that has an outer surface 103a and an inner surface 103b, and the inner surface 103b defines an internal cavity 105. However, other types of components are contemplated. Additionally, it should be understood that the arrangement, number, and size of the cooling holes 102 depicted in FIG. 2 is exemplary, and other cooling hole schemes are contemplated by this disclosure. In most cases, a plurality of cooling holes 102 would be used.

Various types of cooling via cooling holes are known in the art. Some cooling holes, for instance, provide a pathway for cooling air to flow through a component and remove heat through the thickness of the component by heat transfer between the cooling hole walls and the cooling air. Other cooling holes receive cooling air and jet it along a surface of the component so that the cooling air cools the surface by heat transfer between the surface and the cooling air. This is known as film cooling. In the example of FIGS. 2 and 3A-B, the cooling holes 102 are film cooling holes. That is, cooling air flowing through the internal cavity 104 flows from the internal cavity 105, through the cooling holes 102, and along the outer surface 103a of the component to cool the outer surface 103a.

As shown in FIGS. 3A-B the film cooling hole 102 comprises a counterbore that defines a metering portion 104 and an enlarged diffuser portion 106. The metering portion 104 includes a cooling air inlet 108 which receives cooling air from the internal cavity 105 in this example. The diffuser portion 106 includes a cooling air outlet 110 which directs the cooling air along the outer surface 103a.

The metering portion 104 has a diameter D1 that is smaller than a diameter D2 of the diffuser portion 106. In one example, the ratio of the diameters D2 to D1 is between about 1.25 and about 2.5. The counterbore can be formed by any known drilling or other method. The metering portion 104 and the diffuser portion 106 extend along respective axes C1/C2 that are axially offset from one another by an offset O, but are parallel to one another. The offset O is defined in a direction that extends from the axis C1 to the axis C2. In other examples, however, the axes C1/C2 may be angled with respect to one another.

In a particular example, the offset O is equal to a difference in the diameters D1/D2 of the metering portion 104 and the diffuser portion 106. In this example, therefore, the metering portion 104 and diffuser portion 106 together form a straight line along an entire length L between the inlet 108 and outlet 110 at one side of the cooling hole 102, while the opposed side has a stepped geometry.

The axes C1/C2 are angled with respect to the inner and outer surfaces 103a/103b of the component 102 by angles α1 and α2. The angles α1/α2 may be the same or different depending on the relative orientations of the axes C1/C2. The angle α1 is selected based on the local geometry of the airfoil 100 to ensure that the cooling air film created by cooling air exiting the outlet 110 provides adequate cooling to the outer surface 103a, which in general, is accomplished by maximizing the amount of cooling air that tends to remain in the film and travel along the surface 103a. The angle α2 is in some examples equivalent to the angle α1 (e.g., the axes C1/C2 are parallel as discussed above). In other examples, the angle α2 is different from the angle α, but is selected to maintain a minimum wall thickness in the area of the outlet 110 to maintain the structural integrity of the CMC component 100. Additionally, the angle α2 is selected so that the axis C2 is normal to or close to normal to the direction D of coating application, as discussed in more detail below.

CMC components such as the airfoil 100 are often coated with environmental barrier coatings or other coatings 107. Typically, the cooling holes 102 are formed prior to the application of the coating 107. Therefore, in conventional methods, the cooling hole 102 inlet and outlet 108/110 are plugged with pins or combs when the coating 107 is applied so that the coating 107 does not close over the cooling hole 102 inlet or outlet 108/110. However, this plugging process introduces cost and complexity to the manufacturing process. Moreover, removal of the pins or combs after the coating 107 is applied may disturb the coating 107, which could remove portions of the coating 107 around the cooling hole, leaving exposed areas of CMC material and roughnesses that disturb the film cooling described above. Removal of the pins or combs could also introduce weaknesses in the coating and interfere with its integrity.

The counterbored cooling hole 102 eliminates the need for the plugging process as will be described below. In essence, the counterbored cooling hole 102 has a geometry such that a coating can be applied without the need for plugging the cooling hole 102.

With continued reference to FIGS. 3A-B, the cooling hole 102 has a length L. The metering portion 104 and the diffuser portion 106 have respective lengths along the respective axes C1/C2 that sum to the total length L, all of which are defined along the axis C1. The length and diameter D2 of the diffuser portions along with the offset O are selected such that when the coating 107 is applied to the component 100, the coating 107 coats a circumferential portion of the diffuser section 106 (see FIG. 3B), but the metering section 104 remains free from coating 107. Because the coating 107 may only be present on a portion of the circumference of the diffuser section 106, cooling air is still able to pass through the outlet 110 without significantly interfering with the film cooling effect. In a particular example, the coating 107 takes up less than about 50% of the volume of the diffuser portion 106.

The length of the diffuser portion 106 is greater than a line of sight S that is defined from the center of the cooling hole outlet 110 into the diffuser portion 106 in a direction that is normal to the outer surface 103a of the component 100. The length of the diffuser portion 106 is also greater than a thickness T of the coating 107 along the outer surface 103a of the component. In a particular example, the ratio of the length of the diffuser portion 1061 to the thickness T is at least about 3.

In one example, the length of the metering portion 104 is between about 40 and about 85 percent of the length L. In a particular example, the length of the metering portion 104 is between about 60 and about 70 percent of the length L.

The coating 107 can be applied to the component 100 by any known method. Many coating application methods involve spraying, painting, or otherwise applying the coating in slurry or suspension form onto the component 100. For these methods, the coating is applied to the component 100 in a direction D that in the same direction as the offset O, discussed above, which is generally normal to the axis C2. In this way, the metering portion 104 remains free from coating 107 while only a portion of the circumferential extent of the diffuser portion 106 receives coating 107 (as discussed above and shown in FIG. 3B). The coating may then undergo various processing steps, such as drying or heat treatments, as are known in the art.

As used herein, the terms "approximately" and "about" have the typical meaning in the art, however in a particular example "about" or "approximately" can mean deviations of up to 10% of the values described herein.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A ceramic matrix composite component, comprising:
   a ceramic matrix composite wall;
   a coating disposed on the wall; and
   a cooling hole formed in the wall, the cooling hole having
      a metering section defined along a first axis and a diffuser section defined along a second axis that is offset from the first axis, and wherein the cooling hole has a total length defined along the first axis, the total length being the sum of a length of the metering portion and a length of the diffuser portion, wherein the coating takes up less than about 50% of a volume of the diffuser portion.

2. The ceramic matrix composite component of claim 1, wherein the length of the diffuser section is greater than a thickness of the coating.

3. The ceramic matrix composite component of claim 2, wherein a ratio of the length of the diffuser section to the thickness of the coating is at least about 3.

4. The ceramic matrix composite component of claim 1, wherein the length of the metering portion along the first axis is between about 60 percent and about 70 percent of the total length.

5. The ceramic matrix composite component of claim 1, wherein a size of the offset is equivalent to a difference between a diameter of the diffuser section and a diameter of the metering section.

6. The ceramic matrix composite component of claim 5, wherein a ratio of the diameter of the diffuser section to the diameter of the metering section is between about 1.25 and about 2.5.

7. The ceramic matrix composite component of claim 6, wherein the metering portion is free from the coating.

8. The ceramic matrix composite component of claim 1, wherein the length of the metering portion is between about 40 percent and about 85 percent of the total length.

9. A ceramic matrix composite airfoil, comprising:
   a ceramic matrix composite wall defining an inner cavity;
   a coating disposed on an outer surface of the wall; and
   a cooling hole formed in the wall, the cooling hole having
      a metering portion in fluid communication with the inner cavity and defined along a first axis, and a diffuser section defined along a second axis that is offset from the first axis, and wherein the cooling hole has a total length defined along the first axis, the total length being the sum of a length of the metering portion and a length of the diffuser section, wherein the coating takes up less than about 50% of a volume of the diffuser portion.

10. The ceramic matrix composite airfoil of claim 9, wherein the length of the diffuser section is greater than a thickness of the coating.

11. The ceramic matrix composite airfoil of claim 10, wherein a ratio of the length of the diffuser section to the thickness of the coating is at least about three.

12. The ceramic matrix composite airfoil of claim 9, wherein the length of the metering portion along the first axis is between about 60 percent and about 70 percent of the total length.

13. The ceramic matrix composite airfoil of claim 9, wherein the second axis is spaced from the first axis by an offset, and a size of the offset is equivalent to a difference between a diameter of the diffuser section and a diameter of the metering section.

14. The ceramic matrix composite airfoil of claim 13, wherein a ratio of the diameter of the diffuser section to the diameter of the metering section is between about 1.25 and about 2.5.

15. The ceramic matrix composite airfoil of claim 9, wherein the metering section is free from the coating.

16. The ceramic matrix composite airfoil of claim 9, wherein the length of the metering portion is between about 40 percent and about 85 percent of the total length.

17. A method of applying a coating to a ceramic matrix composite component, comprising:

providing a ceramic matrix composite component having a cooling hole therethrough, the cooling hole having a metering section in fluid communication with the inner cavity and defined along a first axis, and a diffuser section defined along a second axis that is offset from the first axis; and applying a coating to a surface of the ceramic matrix composite in a direction of the offset, wherein the coating takes up less than about 50% of a volume of the diffuser portion.

18. The method of claim 17, wherein the metering portion is free from the coating after the applying step.

19. The method of claim 17, wherein the cooling hole has a total length defined along the first axis, the total length being the sum of a length of the metering section and a length of the diffuser portion, and the length of the metering section is between about 40 percent and about 85 percent of the total length.

\* \* \* \* \*